US012617256B2

(12) United States Patent
Pérez Fontaneda et al.

(10) Patent No.: US 12,617,256 B2
(45) Date of Patent: May 5, 2026

(54) ANTIGLARE DEVICE FOR VEHICLES AND METHOD OF USE SUCH DEVICE

(71) Applicant: GRUPO ANTOLÍN-INGENIERÍA, S. A., Burgos (ES)

(72) Inventors: Sara Pérez Fontaneda, Burgos (ES); Rafael García García, Burgos (ES); Andrés Cristóbal Aragón, Burgos (ES)

(73) Assignee: GRUPO ANTOLÍN-INGENIERÍA, S. A., Burgos (ES)

( * ) Notice: Subject to any disclaimer, the term of this patent is extended or adjusted under 35 U.S.C. 154(b) by 392 days.

(21) Appl. No.: 18/380,341

(22) Filed: Oct. 16, 2023

(65) Prior Publication Data

US 2024/0166031 A1 May 23, 2024

(30) Foreign Application Priority Data

Nov. 17, 2022 (EP) ..................................... 22383110

(51) Int. Cl.
B60J 3/02 (2006.01)
G01J 1/42 (2006.01)

(52) U.S. Cl.
CPC ........... B60J 3/0243 (2013.01); G01J 1/4228 (2013.01)

(58) Field of Classification Search
CPC ...... B60J 3/0204; B60J 3/0239; B60J 3/0243; G01J 1/4228
See application file for complete search history.

(56) References Cited

U.S. PATENT DOCUMENTS

2005/0264022 A1 12/2005 Suzuki et al.

FOREIGN PATENT DOCUMENTS

| CN | 106585336 B | * | 2/2022 | ............ | B60J 3/0243 |
|----|----|----|----|----|----|
| DE | 102017006302 A1 | * | 1/2019 | ............ | B60J 3/0204 |
| EP | 3110642 B1 | * | 10/2018 | .......... | G02F 1/0121 |
| JP | H02200518 A | | 8/1990 | | |
| JP | 2002087060 A | * | 3/2002 | | |
| WO | 2015128158 A1 | | 9/2015 | | |

OTHER PUBLICATIONS

Apr. 21, 2023—(EP) Search Report—U.S. Appl. No. 22/383,110.

* cited by examiner

*Primary Examiner* — Lori Lyjak
(74) *Attorney, Agent, or Firm* — Banner & Witcoff, Ltd.

(57) ABSTRACT

Antiglare device for vehicles comprising a retractable sunvisor, a sun sensor and a control unit; the retractable sunvisor comprising a sunvisor screen and a movement mechanism to provide a sliding and rotating movement; the sun sensor comprising one to sixteen photosensors is a unique part; the device also comprises an acceleration sensor comprising one to three accelerometers; the control unit being connected to the movement mechanism, the sun sensor and the acceleration sensor, taking into account all the measurements of the sun sensor and the acceleration sensor. Method of use of the antiglare device that measures the sun light incident angle and intensity, calculates in the control unit of an extent of sliding and/or rotation of the sunvisor screen; the measure step also includes to measure the vehicle movement by the acceleration sensor. The device and method provide an adaptation of the position of the sunvisor at all driving conditions.

16 Claims, 4 Drawing Sheets

ANTIGLARE DEVICE FOR VEHICLES AND METHOD OF USE SUCH DEVICE

CROSS REFERENCE APPLICATIONS

This Application claims priority from European Application 22383110.8 filed on Nov. 17, 2022. The entire contents of the application is incorporated herein by reference in their entirety.

FIELD OF THE INVENTION

The present invention is within the field of antiglare equipment associated with screens, specifically sunvisors for vehicles being adjustable in position by retraction and extension in relation to the roof and headliner of the vehicle.

BACKGROUND OF THE INVENTION

Sunvisors are widely used in vehicles as an essential part to shade the vehicle occupants occupying the front seats from the glare coming from the sun or from the other vehicle lights. Normally, sunvisors are pivotally attached to the vehicle roof through the headliner in order to allow them to adopt two positions, a stowed position in which the sunvisor rests against the headliner main surface, and a frontal use position in which the sunvisor faces the vehicle windshield and shades the glare coming through said windshield.

Most common sunvisors comprises two attachment points to the roof structure: one allowing rotation and another one being removable to allow folding the sunvisor to the side window. Other sunvisors allow extension and retraction, normally named as retractable sunvisors, which are stowed and hidden in a space available between the roof structure and the headliner of the vehicle. Thus, retractable sunvisors can adopt a stowed position when the sunvisor is inside said space, intermediates positions when the sunvisor is outside said space up to a final intermediate position whence it is ready to be rotated, and frontal use positions in which the sunvisor faces the windshield and can be rotated regarding it, being able to shade the glare coming through the windshield in any intermediate position and in any frontal use position to protect the vehicle occupant.

In order to move the retractable sunvisor from the stowed position to the frontal use positions, firstly the sunvisor goes out sliding inside the space available between the roof structure and the headliner until it reaches a final intermediate position. Secondly, it can be rotated from said final intermediate position being the retractable sunvisor close to the windshield, in order to adjust its angular position according to the relative position between the occupant eyes and the glare coming through the windshield, that is the frontal use position.

The optimal position of the sunvisor provides a shade in user's face looking for a compromise between the function to block the sunlight and the function of maximizing the area of vision. Both functions are related to safety when driving, since a reduced level of vision caused by sun glare or reduced vision area caused by the position of the sunvisor reduces visibility.

This optimal position can change due to several reasons when the light intensity or the light incidence angle relative to the vehicle occupant position can change. This changes can occur, for instance, when shifting the direction or slope of the road, which will require the vehicle occupant to adjust manually the sunvisor, that involves to leave one of the vehicle occupant hand off the steering wheel and look for the sunvisor, that also might affect safety while driving. Then, an autonomous sunvisor that adjusts itself automatically to target this optimal position will improve safety while driving as well as enhance the driving experience with a more ergonomic operation of the sunvisor.

An autonomous sunvisor so conceived should have two main elements: an electrical system that can adjust the screen of the sunvisor in different positions, a set of sensors and a controller with software to process the data from the sensors and calculate the optimal position to give a signal to the electrical system to position the screen of the sunvisor.

It is known a patent with publication number DE4118393A1 that discloses an automatic sunvisor based on a movable screen and a sun sensor, preferably with a tubular housing. The sun sensor is orientated to detect the sun intensity in a specific direction, but not giving the sun light incident direction. One of the problem identified is that the sunvisor screen could constantly move back and forth when the light conditions change, then a controllable resistor is assigned to the sun sensor to delay the response time of the sensor to incident light. Also, the position of the sensor is behind the sunvisor, where the location of the sensor is important for proper operation.

It is also known a patent with publication number U.S. Ser. No. 10/699,651B2 that discloses an automatic sunvisor in which the system that adjust the blocking area is a LCD panel with pixels arranged in grid formation that can block the sun by changing the LCD state from transparent to opaque in the selected pixels to optimize sun blocking area. The disadvantages are the cost of the LCD panel and its weight higher than a traditional sunvisor screen, which will require a more complex mechanism to deploy it. In this invention, the deployment system of this panel is not solved, which will affect the ergonomics of the operation. Also discloses a method to calculate the blocking elements position based on the illumination measured in a certain area, preferably done by a camera pointing towards the vehicle occupant which detects the illumination level on the face of the vehicle occupant. A controller processes this signal and activates the blocking elements if this illumination level exceeds a certain threshold. The way the system reacts under certain fast illumination changes that can be produced by heavy road conditions or sudden illumination changes due to different objects as trees or buildings is not described. Also, it is not disclosed a manner to differentiate against annoying light, for example, when it receives lateral light the device detects it and moves the sunvisor without analyzing whether it is annoying. On the other hand, the rapid change of LCD pixels can be perceived as an annoying flickering.

It is also known a patent with publication number KR20220046385A that refers to a controller for a sunvisor based on a light sensor and a driver's gaze sensor. It is not mentioned how this system will operate under variable light incidence conditions. It does not describe neither the details of the light sensor and the sunvisor configuration that will be able to work smoothly under this concept. Also, the position of the sensor is behind the sunvisor, where the location of the sensor is important for proper operation.

It is also known a patent with publication number U.S. Pat. No. 7,568,751B2 that discloses a controlling method for an autonomous sunvisor based on a photosensor signal in which depending on the light intensity signal the movement of the sunvisor acts in different ways if the signal overpasses or not different thresholds. This allows the system to reduce constant movements of the sunvisor when the signal variates, so the system does not annoy the driver. Signal is filtered by means of statistical analysis and delay times. This delay times can have a negative effect in some conditions, when the light intensity is high but the light sensor receives a variable signal and then does not deploy in a minimum time, which will become a safety issue.

According to the state of the art there is a need of an autonomous sunvisor, being a combination of a sunvisor mechanism and a set of sensors, including the minimum of elements that can make it work smoothly under all driving conditions with constant changes in the light incident direction and intensity, keeping the most important function which is to avoid vehicle occupant glaring with the sun.

DESCRIPTION OF THE INVENTION

The present invention is established and characterised in the independent claims, while the dependent claims describe additional characteristics thereof.

The object of the invention is an antiglare device for vehicles and the method of its use, including an autonomous sunvisor. The problem to be solved is to configure the elements of the device, including a set of sensors, and the steps of the method that allows the sunvisor to adapt its position at all driving conditions avoiding sudden repetitive or very delayed movements of the sunvisor.

The invention is an antiglare device for vehicles, comprising a retractable sunvisor, a sun sensor and a control unit; the retractable sunvisor comprising:
  a sunvisor screen being configured to move according to a sliding movement between a stowed position, in which the sunvisor screen is inside a space formed between a headliner and a roof sheet, several intermediate positions, in which the sunvisor screen is partially outside the space formed between the headliner and the roof sheet up to a final intermediate position in which the sunvisor screen is totally outside such space, and several frontal use positions according to a rotating movement of the sunvisor screen (1.1) regarding the windshield, in any position of the sunvisor screen a vehicle occupant can be protected from the glare of sun light coming through the windshield;
  a movement mechanism being configured to provide the sliding movement and the rotating movement of the sunvisor screen;
the sun sensor comprising one to sixteen photosensors or light detectors being configured to measure the light incident angle and light intensity, the sun sensor is able not only to measure the amount of light but also the light incidence direction that could dazzle an occupant;
the control unit being connected to the movement mechanism and to the sun sensor, including a sunvisor edge path, an initial vehicle occupant eyes position, a light intensity threshold and a light incident angle range, as four set of data that the control unit contains by default, and being configured to calculate the edge position of the sunvisor screen by intersection of the sunvisor edge path and a line parallel to sun light passing through the initial vehicle occupant eyes position, and to send the sliding movement and/or the rotating movement of the sunvisor screen to the movement mechanism to reach the edge position when the light intensity is over the threshold and the light incident angle is within the light incident angle range; as is known in the state of the art.

The antiglare device is characterized in that the sun sensor is a unique part, the control unit also includes a margin area of the initial vehicle occupant eyes position projected downwards from said position taking part of the default data, and also comprises an acceleration sensor, comprising one to three accelerometers being configured to measure the vehicle movement in the three axis X,Y,Z; the control unit being connected to the acceleration sensor and being configured to receive and process directly the vehicle movement from the acceleration sensor; in such a way that the control unit is able to take into account both the measurements of light incident angle and light intensity from the sun sensor and the measurement of vehicle movement from the acceleration sensor to send the sliding movement and/or the rotating movement of the sunvisor screen to the movement mechanism to reach the edge position. The control unit is considered to include implicitly means to receive, manage, make calculations and send results using as variables the measurements of the sensors, as a control unit known in the state of the art, for instance, including a PCB with a microprocessor and its corresponding software, apart from other electric or electronics elements for a correct functioning and signal managing.

The sun sensor is a unique part means that its components take part of a unique piece, normally arranged in a housing, to make a unit that can be managed as a unity, for handling, assembly, etc. This also provides the advantage of avoiding several wirings, when having several sensors as known in the state of the art, just having one wiring, with savings in material cost, manufacturing, assembly, etc. The number of one to sixteen photosensors or light detectors being a unique part comes from a minimum to a proved maximum of sixteen, when exceeding will not provide a remarkable better behaviour and will increase its price and complexity.

The condition of the acceleration sensor involves to measure the vehicle movement in the three axis X,Y,Z, being one, two or three accelerometers, each of them uniaxial, biaxial or triaxial ones, in any combination to fulfill at least the condition of measurement in the three axis.

The processing being directly of the vehicle movement from the accelerometer means that the signal follows a straight treatment, avoiding delays, that is, emission follows its reception without intermediate calculation, being different form the statistical adjustment known in the state of the art.

The X, Y, Z directions and the corresponding planes are those forming the usual orthogonal triedron in the automotive industry: X axis corresponds to the direction of movement of the vehicle, following a longitudinal axis of the vehicle; Y axis corresponds to the width of the vehicle, following a transversal axis of the vehicle; Z axis corresponds to the height of the vehicle.

The margin area can be configured, for instance can be adapted in a software program in the control unit and depends on objective and subjective variables: being objective a system tolerance: motor, final reduction system, electronics, and vehicle geometry; and being subjective under user preferences.

The invention is also a method of use of an antiglare device for vehicles as described here above, wherein the control unit includes a sunvisor edge path, a vehicle occupant eyes position, a light intensity threshold and a light incident angle range, comprising the following steps in sequence:
  measure of the sun light direction and intensity in both XZ and YZ planes by the sun sensor, send the measurements to the control unit;
  calculation in the control unit of an extent of sliding and/or rotation of the sunvisor screen, in any position of the sunvisor screen a vehicle occupant can be protected from the glare coming through the windshield, when light intensity is over the light intensity threshold and the light incident angle is within the light
incident angle range, being the extent a movement to
reach the edge position by intersection of the sunvisor
edge path with a line parallel to sun light passing
through the vehicle occupant eyes position;

sending the extent of sliding and/or rotation to the move-
ment mechanism, sliding and/or rotation of the sunvisor screen, as is known
in the state of the art.

The method of use is characterised in that the measure
step also includes to measure the vehicle movement by the
acceleration sensor and send the signal to the control unit,
the calculation step also takes into account the measurement
of the vehicle movement.

The vehicle occupant eyes position introduced as a pre-
determined data in the control unit and used in the method
normally corresponds to the 95th percentile of a mannequin.

An advantage of the invention is that provides a predictive
device and method in the sense of having predetermined
values corresponding to a recognized event, in the sense of
an event being known by the device, and when the mea-
surements fulfill the conditions for the predetermined values
the device reacts immediately, avoiding the disadvantage of
slow reaction, for instance when using statistical calculation,
or the absence of reaction, for instance when no recognizing
an event, as occurs in the state of the art.

Another advantage is that the sun sensor is more accurate
than several photosensors located at different locations
working together, so the sunvisor taking into account the
acceleration sensor moves accurately avoiding false move-
ments or misalignments that would glare the occupant,
typically coming from frequent changes of light intensity
and incident angle in a short period of time that can be
produced by the changes in the inclination of the vehicle
causing the system not to function correctly.

Furthermore, the margin area provides that most of the
eyes of the vehicle occupants are covered by the sunvisor
without prior calibration, that is, with a minimum of ele-
ments of a device the most of occupants are protected with
an antiglare device; being the device also compatible to
further elements like cabin sensing means (Driver Monitor-
ing Systems—DMS—, Occupancy Monitoring Systems—
OMS—, or occupant monitoring use element, following the
name as mentioned in the detailed description here below.
The margin area is variable according to local or regional
specifications, since will cover normally at least the 95% of
occupants, being different, for instance, in Asia, in Europe,
in America, etc.

In this description "occupant" means any user of the
vehicle being susceptible of receiving the protection of a
sunvisor, namely the driver and the front passenger. It is
understood that the protection of the driver is more impor-
tant regarding driving security. The invention is valid for any
occupant, giving rise to an independent functioning of
sunvisor's driver and front passenger.

Other advantages regarding the features in the dependent
claims can be found in the detailed description here below.

BRIEF DESCRIPTION OF THE DRAWINGS

The present document is complemented with a set of
drawings as an example for illustrating the preferred
embodiment, and which in no way limits the invention.

DETAILED DESCRIPTION OF THE INVENTION

Figure 1:
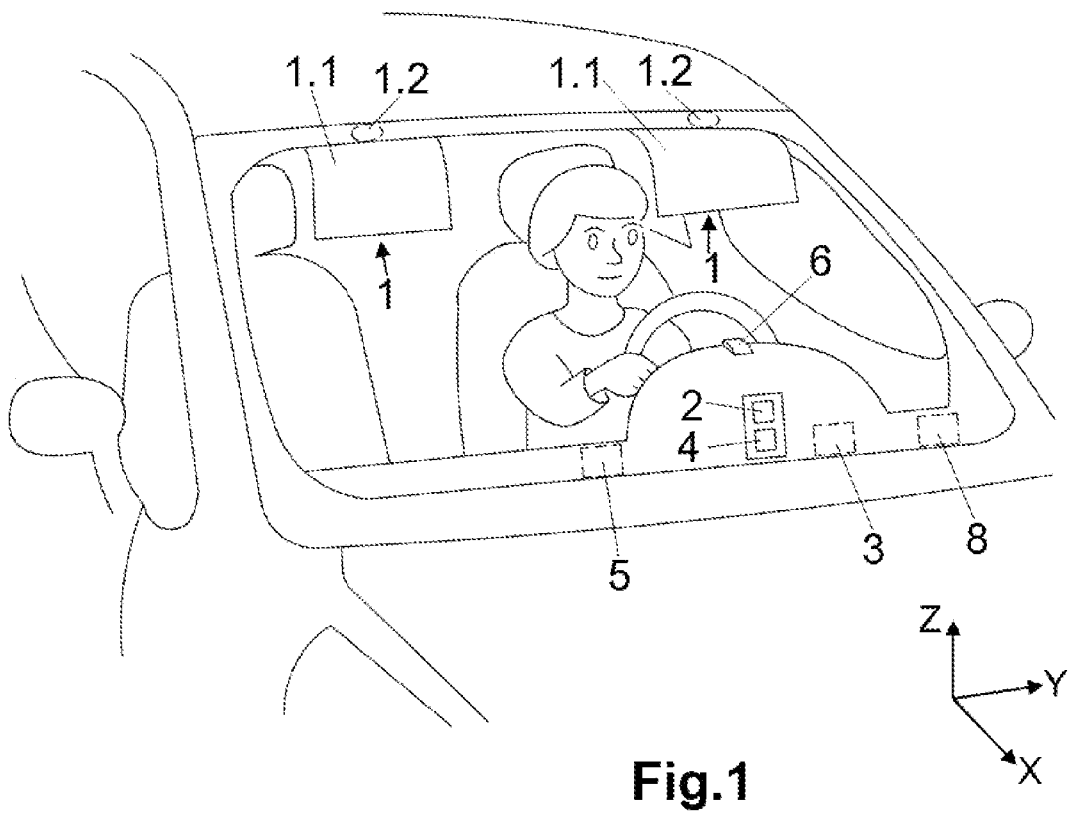
FIG. 1 shows a frontal perspective view of a vehicle
including the antiglare device of the invention.
Figure 2:
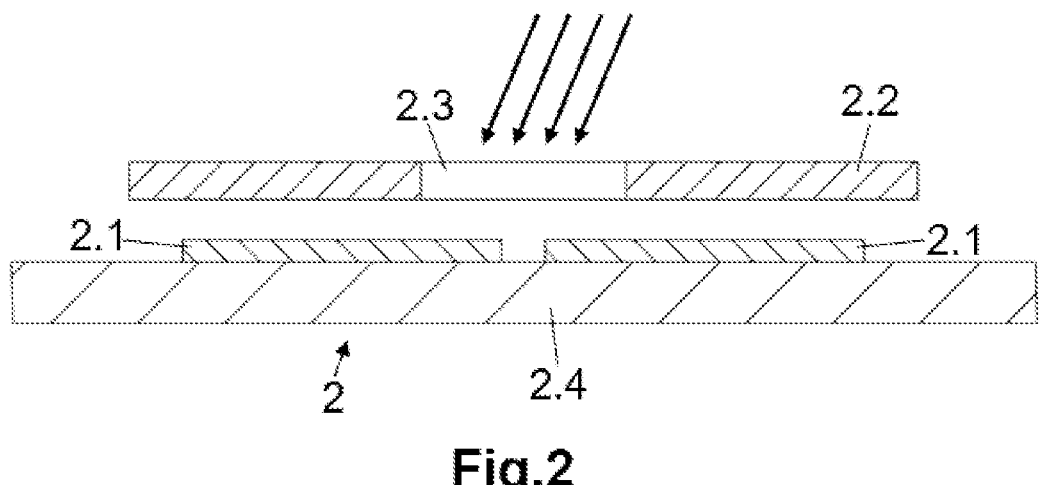
FIG. 2 shows a lateral view of an embodiment of the sun
sensor of the invention.
Figure 4:
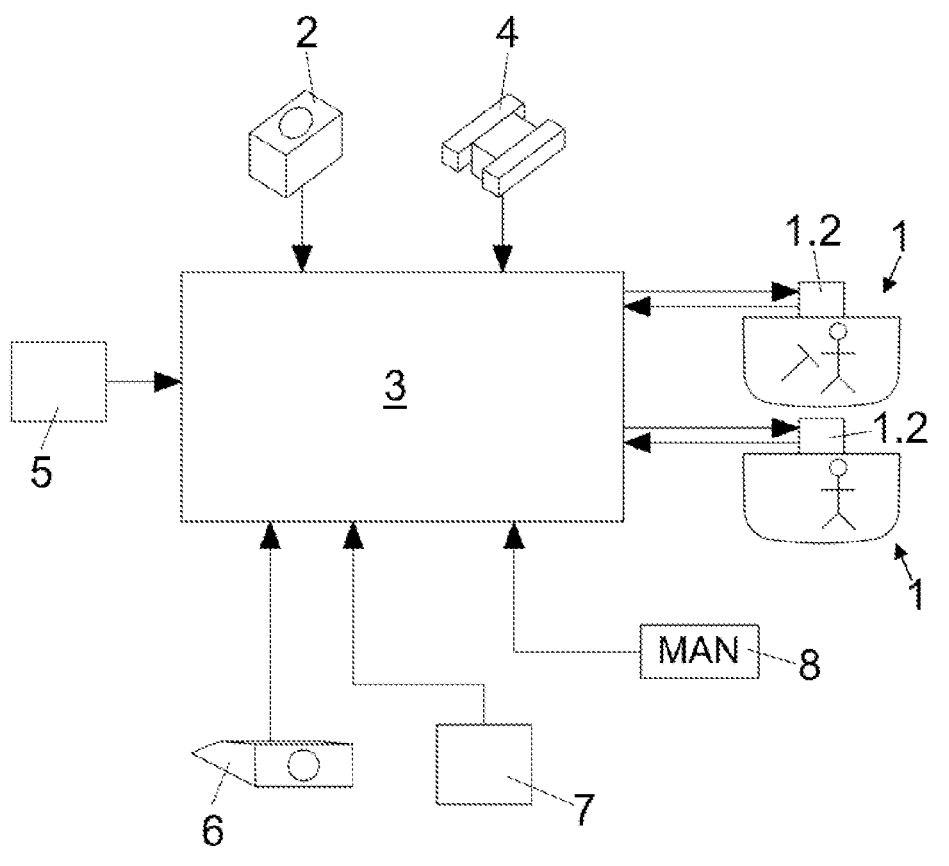
FIG. 4 discloses a scheme view of the components of the
antiglare device of the invention and the flow of signals.
Figure 5:
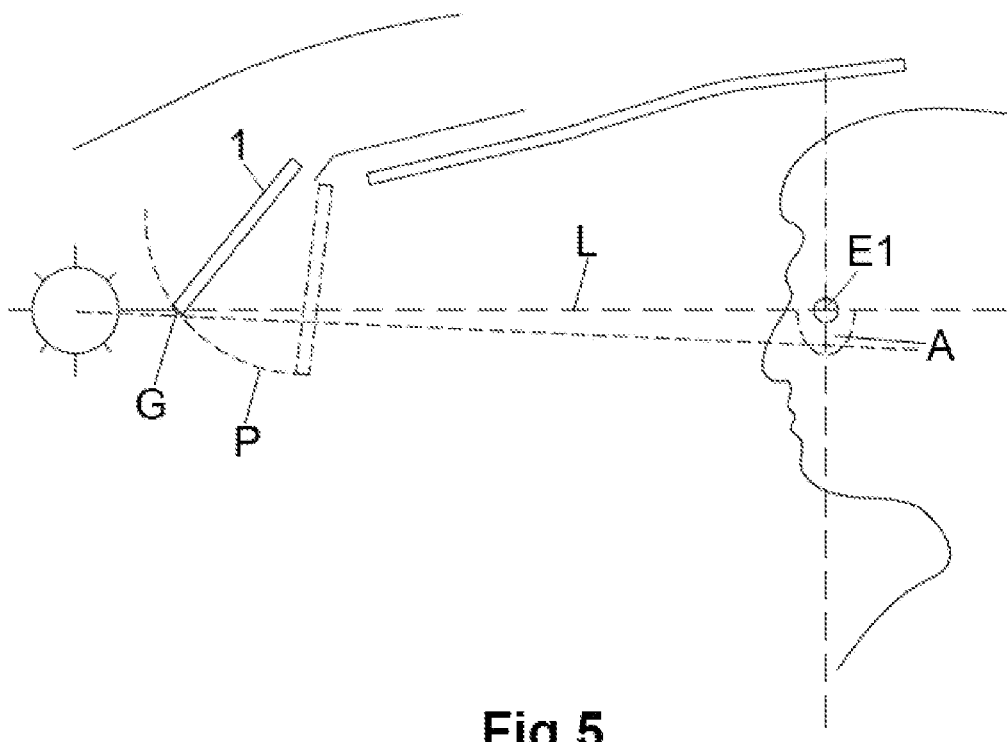
FIG. 5 shows a scheme view disclosing the sunvisor edge
path and the initial vehicle occupant eyes position.

FIG. 1 discloses an antiglare device for vehicles, com-
prising a retractable sunvisor (1), in the figure both sunvisors
(1) are depicted, a sun sensor (2) and a control unit (3); the
retractable sunvisor (1) comprising:

a sunvisor screen (1.1) being configured to move accord-
ing to a sliding movement between a stowed position,
in which the sunvisor screen (1.1) is inside a space
formed between a headliner and a roof sheet, and
several intermediate positions, in which the sunvisor
screen (1.1) is partially outside the space formed
between the headliner and the roof sheet up to a final
intermediate position in which the sunvisor screen (1.1)
is totally outside such space, and several frontal use
positions according to a rotating movement of the
sunvisor screen (1.1) regarding the windshield, in any
position of the sunvisor screen (1.1) a vehicle occupant
can be protected from the glare of sun light coming
through the windshield;

a movement mechanism (1.2), shown in FIG. 1 and in the
scheme view of FIG. 4, being configured to provide the
sliding movement and the rotating movement of the
sunvisor screen (1.1);

the sun sensor (2) comprising one to sixteen photosensors or
light detectors (2.1), FIG. 2, being configured to measure the
light incident angle and light intensity;

the control unit (3), FIG. 1, being connected to the move-
ment mechanism (1.2) and to the sun sensor (2), FIG. 4,
including a sunvisor edge path (P), an initial vehicle occu-
pant eyes position (E1), a light intensity threshold and a light
incident angle range, FIG. 5, and being configured to cal-
culate the edge position (G) of the sunvisor screen (1.1),
FIG. 5, by intersection of the sunvisor edge path (P) and a
line parallel to sun light (L) passing through the initial
vehicle occupant eyes position (E1), and also being config-
ured to send the sliding movement and/or the rotating
movement of the sunvisor screen (1.1) to the movement
mechanism (1.2) to reach the edge position (G) when the
light intensity is over the threshold and the light incident
angle is within the light incident angle range; the sun sensor
(2) is a unique part, FIGS. 1 and 2, the control unit (3) also
includes a margin area (A) of the initial vehicle occupant
eyes position (E1) projected downwards from said position,
depicted as a semiellipse in FIG. 5, the antiglare device also
comprises an acceleration sensor (4), FIGS. 1 and 4, com-
prising one to three accelerometers being configured to
measure the vehicle movement in the three axis X,Y,Z; the
control unit (3) being connected to the acceleration sensor
(4), FIG. 4, and being configured to receive and process
directly the vehicle movement from the acceleration sensor

7

(4); in such a way that the control unit (3) is able to take into account the measurements of light incident angle and light intensity from the sun sensor (2) and the measurement of vehicle movement from the acceleration sensor (4) to send the sliding movement and/or the rotating movement of the sunvisor screen (1.1) to the movement mechanism (1.2) to reach the edge position (G).

Specifically, the light intensity threshold is a value from 0 W/m² up to or equal to 1200 W/m² and wherein the incident angle range is between a horizontal line passing through the initial vehicle occupant eyes position (E1) to 90° above in XZ plane and between −90° and +90° in XY plane with center in the initial vehicle occupant eyes position (E1). These values of threshold and angle have been proved to be advantageous. About the light intensity threshold, selecting a value that dazzles an occupant could be subjective, sometimes a very low value in a cloudy day is annoying, other times a high value in a sunny day is not annoying for the occupant. About the incident angle range, the asymmetrical consideration in XZ and XY planes provides an efficient detection. The values and ranges disclosed here for the antiglare device are also applicable to the method of its use as described here below.

A detail of the margin area (A) is that is sized to include 95% of vehicle occupants. That is, in relation to local or regional specifications, taking into account the physiological dimensions of the population.

Figure 6:
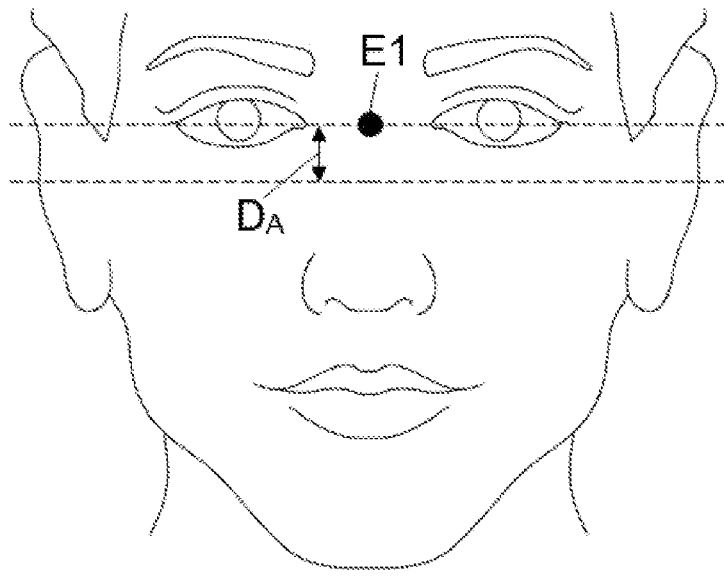
FIG. 6 shows a frontal view of an occupant indicating the
margin area of the initial vehicle occupant eyes position.
Figures 7, 8:
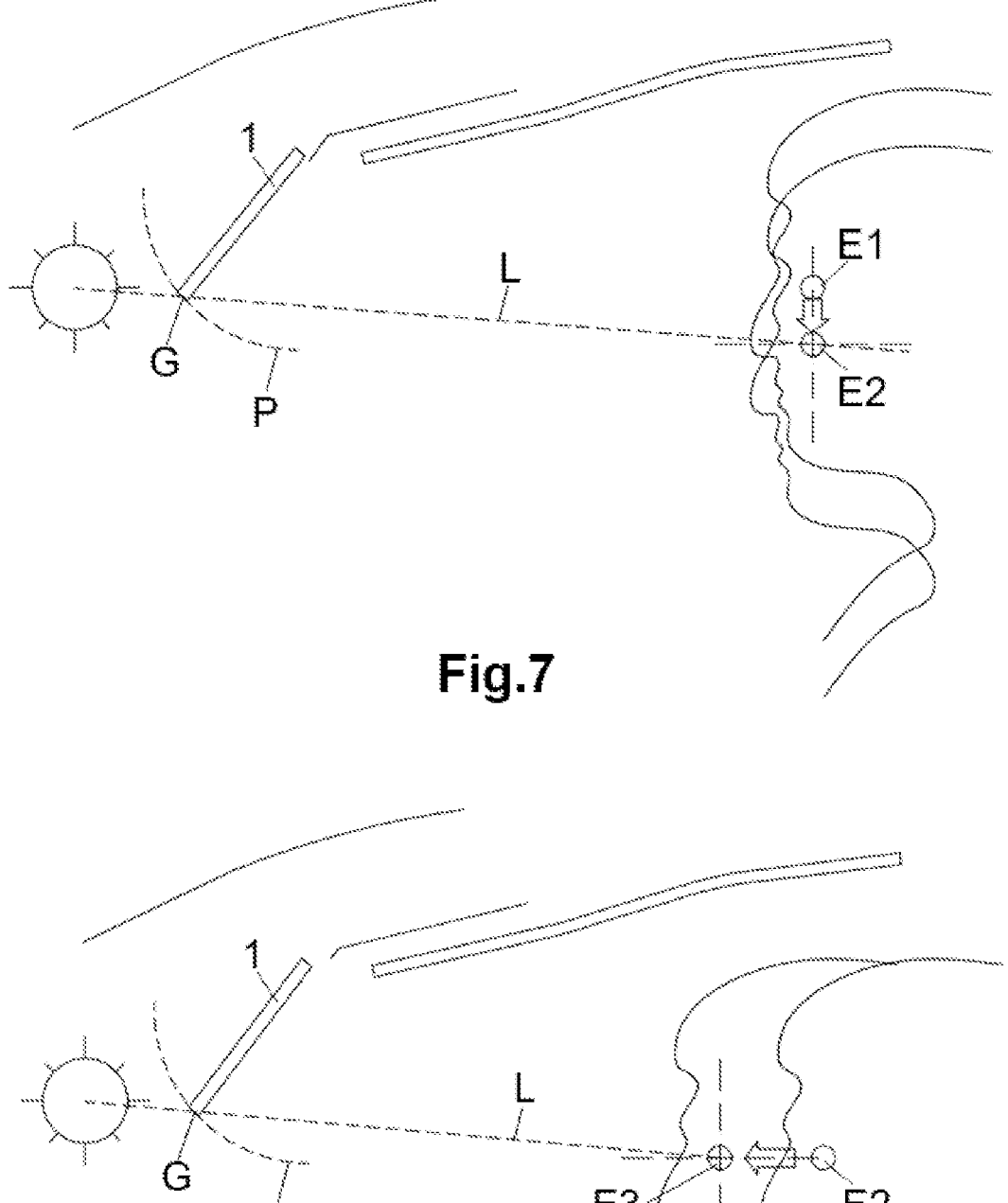
FIG. 7 shows a scheme view disclosing an adjustment in
Z from the initial vehicle occupant eyes position to a
Z-changed vehicle occupant eyes position.
FIG. 8 discloses a scheme view disclosing an adjusting in
X from the Z-changed vehicle occupant eyes position of
FIG. 7 to a X-changed vehicle occupant eyes position.

In FIG. 5, the line parallel to sun light (L) passing through the initial vehicle occupant eyes position (E1) is depicted as a horizontal line, which is a mere representation, no limitative, being inclined lines in FIGS. 7 and 8. In FIG. 5 is depicted an inclined line corresponding a sun light within the margin area (A) as a pictorial simple view, taking into account the margin area (A) will cover as many points as desired, ideally infinite points. The margin area (A) named here above as a semiellipse is a preferred shape, but any other is possible. In FIG. 6, the frontal view discloses position E1 as a medium way in between the eyes of the occupant, the semiaxis (DA) of the semiellipse gives an idea of the dimension of the margin area (A), being for instance one third of the distance from the eyes to the nose of the vehicle occupant.

An option shown in FIGS. 1 and 4 is that the antiglare device also comprises a geolocalization element (5) being configured to register the position of the vehicle; the control unit (3) being connected to the geolocalization element (5) and being configured to receive and process the position of the vehicle regarding the light intensity threshold, thus taking into account, for example, the latitude, radiation, time in the day or season. Thus, being adapted to local and current conditions.

Another option shown in FIGS. 1 and 4 is that the antiglare device also comprises an occupant monitoring use element (6) being configured to detect the initial vehicle occupant eyes position (E1), a Z-changed vehicle occupant eyes position (E2), a X-changed vehicle occupant eyes position (E3), as described here below, or any other vehicle occupant eyes position; the control unit (3) being connected to the occupant monitoring use element (6) and being configured to receive and process the initial vehicle occupant eyes position (E1). The occupant monitoring use element (6) makes the detection of occupant's eyes automatically, with the inherent advantages of being faster and easier than introducing the corresponding data.

Another option shown in FIG. 2 is that the sun sensor (2) comprises two photosensors (2.1) arranged on a base (2.4) and a mask (2.2) on the photosensors (2.1), the mask (2.2) includes a window (2.3), light beams of sun light can go through the window (2.3) to the photosensors (2.1). A detail is that the window (2.3) is configured to provide a precision equal or higher than 1°. This configuration is verified to give a high level of accuracy, being not very complicated.

Figure 3:
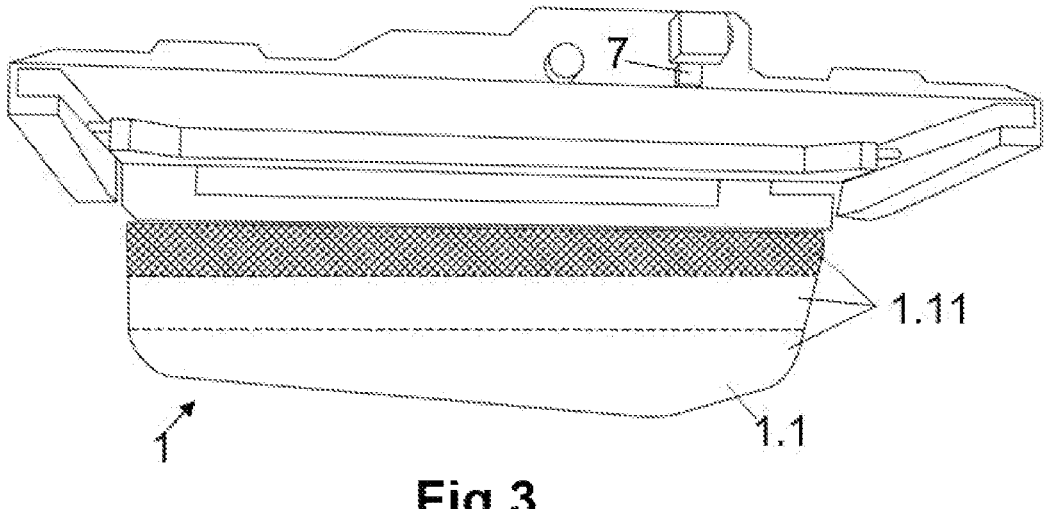
FIG. 3 shows a perspective view of a sunvisor with a
screen made of a dimmable material.

Another option shown in FIGS. 3 and 4 is that the sunvisor screen (1.1) is made of a dimmable material and comprises a dimming electronic element (7) being configured to change the transparency of the sunvisor screen (1.1) completely or in a partial area (1.11); the control unit (3) being connected to the dimming electronic element (7) and being configured to send dimming signals to the dimming electronic element (7). This configuration could be valid for some applications where dimming is required, being compatible with other types of technologies like transparent screens, not opaques, contrary to traditional sun visors.

The invention is also the method of use of an antiglare device for vehicles as described here above, wherein the control unit (3) includes a sunvisor edge path (P), an initial vehicle occupant eyes position (E1), a light intensity threshold and a light incident angle range, comprising the following steps in sequence:

measurement of the sun light incident angle and intensity by the sun sensor (2), send the measurements to the control unit (3);

calculation in the control unit (3) of an extent of sliding and/or rotation of the sunvisor screen (1.1) to any position of the sunvisor screen (1.1) a vehicle occupant can be protected from the glare coming through the windshield, when light intensity is over the light intensity threshold and the light incident angle is within the light incident angle range, being the extent a movement to reach the edge position (G) by intersection of the sunvisor edge path (P) with a line parallel to sun light (L) passing through the initial vehicle occupant eyes position (E1);

sending the extent of sliding and/or rotation to the movement mechanism (1.2), sliding and/or rotation of the sunvisor screen (1.1), the control unit (3) also includes a margin area (A) of the initial vehicle occupant eyes position (E1) projected downwards from said position and takes it into account when calculating the intersection of the sunvisor edge path (P) with a line parallel to sun light (L);

the measure step also includes to measure the vehicle movement by the acceleration sensor (4) and send the signal to the control unit (3), the calculation step also takes into account the measurement of the vehicle movement.

An option of the method is that prior to measure the sun light incident angle, the light intensity and the vehicle movement or prior to calculate the extent of sliding and/or rotation of the sunvisor screen (1.1), the position in Z of the initial vehicle occupant eyes position (E1) is changed to a Z-changed vehicle occupant eyes position (E2) by the vehicle occupant through a manual operation switch (8), FIG. 4, the control unit (3) calculates a different edge position (G) by intersection of the sunvisor edge path (P) with the line parallel to sun light through the Z-changed vehicle occupant eyes position (E2), FIG. 7. Also, after adjusting in Z, the position in X of the vehicle occupant eyes could be also changed to a X-changed vehicle occupant eyes position (E3) by the vehicle occupant through the manual operation switch (8), the control unit (3) calculates a different edge position (G) by intersection of the sunvisor edge path (P) with the line parallel to sun light (L) through the X-changed vehicle occupant eyes position (E3), FIG. 8. For an occupant out of the average covered by the default values, normally shorter but also taller, included in the initial vehicle occupant eyes position (E1), or an occupant feeling uncomfortable, his position can be changed by shifting its height or horizontal seat position; thus the default position of the sunvisor (1) should be changed giving the chance to keep an optimum functioning to protect occupant from sun glare.

Another option of the method includes a geolocalization element (5) as described above, the geolocalization element (5) provides the position of the vehicle to the control unit (3) to adapt the light intensity threshold. This provides an adaptation to local and current conditions.

Another option of the method includes the occupant monitoring use element (6) as described above, which detects the initial vehicle occupant eyes position (E1), the Z-changed vehicle occupant eyes position (E2) or the X-changed vehicle occupant eyes position (E3); the control unit (3) connected to the occupant monitoring use element (6), receives and processes the vehicle occupant eyes position (E1,E2,E3). This provides an automatic detection of the vehicle occupant eyes position.

Another option of the method when includes a dimming electronic element (7) as described above, the dimming electronic element (7) provides signals to the control unit (3) to change the transparency of the sunvisor screen (1.1) completely or in a partial area (1.11). Transparent-like screens of sunvisors become compatible with the method here disclosed.

The invention claimed is:

1. Antiglare device for vehicles, comprising a retractable sunvisor (1), a sun sensor (2) and a control unit (3); the retractable sunvisor (1) comprising:

a sunvisor screen (1.1) being configured to move according to a sliding movement between a stowed position, in which the sunvisor screen (1.1) is inside a space formed between a headliner and a roof sheet, several intermediate positions, in which the sunvisor screen (1.1) is partially outside the space formed between the headliner and the roof sheet up to a final intermediate position in which the sunvisor screen (1.1) is totally outside such space, and several frontal use positions according to a rotating movement of the sunvisor screen (1.1) regarding a windshield, in any position of the sunvisor screen (1.1) a vehicle occupant can be protected from the glare of sun light coming through the windshield;

a movement mechanism (1.2) being configured to provide the sliding movement and the rotating movement of the sunvisor screen (1.1);

the sun sensor (2) comprising one to sixteen photosensors or light detectors (2.1) being configured to measure the light incident angle and light intensity;

the control unit (3) being connected to the movement mechanism (1.2) and to the sun sensor (2), including a sunvisor edge path (P), an initial vehicle occupant eyes position (E1), a light intensity threshold and a light incident angle range, and being configured to calculate the edge position (G) of the sunvisor screen (1.1) by intersection of the sunvisor edge path (P) and a line parallel to sun light (L) passing through the initial vehicle occupant eyes position (E1), and also being configured to send the sliding movement and/or the rotating movement of the sunvisor screen (1.1) to the movement mechanism (1.2) to reach the edge position (G) when the light intensity is over the threshold and the light incident angle is within the light incident angle range;

characterized in that the sun sensor (2) is a unique part, the control unit (3) also includes a margin area (A) of the initial vehicle occupant eyes position (E1) projected downwards from said position, the antiglare device also comprises an acceleration sensor (4), comprising one to three accelerometers, being configured to measure the vehicle movement in the three axis X,Y,Z; the control unit (3) being connected to the acceleration sensor (4) and being configured to receive and process directly the vehicle movement from the acceleration sensor (4); in such a way that the control unit (3) is able to take into account both the measurements of light incident angle and light intensity from the sun sensor (2) and the measurement of vehicle movement from the acceleration sensor (4) to send the sliding movement and/or the rotating movement of the sunvisor screen (1.1) to the movement mechanism (1.2) to reach the edge position (G).

2. Antiglare device for vehicles according to claim 1 wherein the margin area (A) being sized to include 95% of vehicle occupants.

3. Antiglare device for vehicles according to claim 1 wherein the light intensity threshold is a value from 0 W/m$^2$ up to or equal to 1200 W/m$^2$ and wherein the incident angle range is between a horizontal line passing through the initial vehicle occupant eyes position (E1) to 90° above in XZ plane and between −90° and +90° in XY plane with center in the initial vehicle occupant eyes position (E1).

4. Antiglare device for vehicles according to claim 1 that also comprises a geolocalization element (5) being configured to register the position of the vehicle; the control unit (3) being connected to the geolocalization element (5) and being configured to receive and process the position of the vehicle regarding the light intensity threshold.

5. Antiglare device for vehicles according to claim 1 also comprising an occupant monitoring use element (6) being configured to detect the initial vehicle occupant eyes position (E1), a Z-changed vehicle occupant eyes position (E2) or a X-changed vehicle occupant eyes position (E3); the control unit (3) being connected to the occupant monitoring use element (6) and being configured to receive and process the vehicle occupant eyes position (E1,E2,E3).

6. Antiglare device for vehicles according to claim 1 wherein the sun sensor (2) comprises two photosensors (2.1) arranged on a base (2.4) and a mask (2.2) on the photosensors (2.1), the mask (2.2) includes a window (2.3), light beams of sun light can go through the window (2.3) to the photosensors (2.1).

7. Antiglare device for vehicles according to claim 6 wherein the window (2.3) is configured to provide a precision equal or higher than 1°.

8. Antiglare device for vehicles according to claim 1 wherein the sunvisor screen (1.1) is made of a dimmable material and comprises a dimming electronic element (7) being configured to change the transparency of the sunvisor screen (1.1) completely or in a partial area (1.11); the control unit (3) being connected to the dimming electronic element (7) and being configured to send dimming signals to the dimming electronic element (7).

9. Method of use of an antiglare device for vehicles according to claim 1, wherein the control unit (3) includes a sunvisor edge path (P), an initial vehicle occupant eyes position (E1), a light intensity threshold and a light incident angle range, comprising the following steps in sequence:

measure of the sun light incident angle and intensity by the sun sensor (2), send the measurements to the control unit (3);

calculation in the control unit (3) of an extent of sliding and/or rotation of the sunvisor screen (1.1) to any position of the sunvisor screen (1.1) a vehicle occupant can be protected from the glare coming through a windshield, when light intensity is over the light intensity threshold and the light incident angle is within the light incident angle range, being the extent a movement to reach the edge position (G) by the intersection of the sunvisor edge path (P) with a line parallel to sun light (L) passing through the initial vehicle occupant eyes position (E1);

sending the extent of sliding and/or rotation to the movement mechanism (1.2), slicing and/or rotation of the sunvisor screen (1.1), characterised in that the control unit (3) also includes a margin area (A) of the initial vehicle occupant eyes position (E1) projected downwards from said position and takes it into account when calculating the intersection of the sunvisor edge path (P) with a line parallel to sun light (L); the measure step also includes to measure the vehicle movement by the acceleration sensor (4) and send the signal to the control unit (3), the calculation step also takes into account the measurement of the vehicle movement.

10. Method of use according to claim 9 wherein the light intensity threshold is a value from 0 W/m² up to or equal to 1200 W/m² and wherein the incident angle range is between 90° from a horizontal line passing through the initial vehicle occupant eyes position (E1) and above in XZ plane and between −90° and +90° in XY plane with center in the initial vehicle occupant eyes position (E1).

11. Method of use according to claim 9 wherein prior to measure the sun light incident angle, the light intensity and the vehicle movement or prior to calculate the extent of sliding and/or rotation of the sunvisor screen (1.1), the position in Z of the initial vehicle occupant eyes position (E1) is changed to a Z-changed vehicle occupant eyes position (E2) by the vehicle occupant through a manual operation switch (8), the control unit (3) calculates a different edge position (G) by intersection of the sunvisor edge path (P) with the line parallel to sun light (L) through the Z-changed vehicle occupant eyes position (E2).

12. Method of use according to claim 11 wherein the position in X of the vehicle occupant eyes is changed to a X-changed vehicle occupant eyes position (E3) by the vehicle occupant through the manual operation switch (8), the control unit (3) calculates a different edge position (G) by intersection of the sunvisor edge path (P) with the line parallel to sun light (L) through the X-changed vehicle occupant eyes position (E3).

13. Method of use according to claim 9 wherein the antiglare device also comprises a geolocalization element (5) being configured to register the position of the vehicle;

the control unit (3) being connected to the geolocalization element (5) and being configured to receive and process the position of the vehicle regarding the light intensity threshold; the geolocalization element (5) provides the position of the vehicle to the control unit (3) to adapt the light intensity threshold.

14. Method of use according to claim 11 wherein the antiglare device also comprises an occupant monitoring use element (6) being configured to detect the initial vehicle occupant eyes position (E1), a Z-changed vehicle occupant eyes position (E2) or a X-changed vehicle occupant eyes position (E3); the control unit (3) being connected to the occupant monitoring use element (6) and being configured to receive and process the vehicle occupant eyes position (E1,E2,E3); the occupant monitoring use element (6) detects the initial vehicle occupant eyes position (E1), the Z-changed vehicle occupant eyes position (E2) or the X-changed vehicle occupant eyes position (E3); the control unit (3) connected to the occupant monitoring use element (6), receives and processes the vehicle occupant eyes position (E1,E2,E3).

15. Method of use according to claim 12 wherein the antiglare device also comprises an occupant monitoring use element (6) being configured to detect the initial vehicle occupant eyes position (E1), a Z-changed vehicle occupant eyes position (E2) or a X-changed vehicle occupant eyes position (E3); the control unit (3) being connected to the occupant monitoring use element (6) and being configured to receive and process the vehicle occupant eyes position (E1,E2,E3); the occupant monitoring use element (6) detects the initial vehicle occupant eyes position (E1), the Z-changed vehicle occupant eyes position (E2) or the X-changed vehicle occupant eyes position (E3); the control unit (3) connected to the occupant monitoring use element (6), receives and processes the vehicle occupant eyes position (E1,E2,E3).

16. Method of use according to claim 9 wherein the sunvisor screen (1.1) is made of a dimmable material and comprises a dimming electronic element (7) being configured to change the transparency of the sunvisor screen (1.1) completely or in a partial area (1.11); the control unit (3) being connected to the dimming electronic element (7) and being configured to send dimming signals to the dimming electronic element (7); the dimming electronic element (7) provides signals to the control unit (3) to change the transparency of the sunvisor screen (1.1) completely or in a partial area (1.11).

* * * * *